United States Patent
Nicol et al.

(10) Patent No.: US 6,932,858 B2
(45) Date of Patent: Aug. 23, 2005

(54) VORTEX TUBE SYSTEM AND METHOD FOR PROCESSING NATURAL GAS

(75) Inventors: Donald V. Nicol, Henderson, TX (US); Mark J. Lane, Richardson, TX (US)

(73) Assignee: Gas Technology Institute, Des Plaines, IL (US)

( * ) Notice: Subject to any disclaimer, the term of this patent is extended or adjusted under 35 U.S.C. 154(b) by 145 days.

(21) Appl. No.: 10/649,991

(22) Filed: Aug. 27, 2003

(65) Prior Publication Data

US 2005/0045033 A1 Mar. 3, 2005

(51) Int. Cl.[7] .......................... B01D 45/12; B01D 50/00
(52) U.S. Cl. ............................. 95/269; 55/315; 55/343; 55/417; 55/459.1; 62/5
(58) Field of Search .............................. 95/269; 55/343, 55/315, 417, 459.1; 62/5

(56) References Cited

U.S. PATENT DOCUMENTS

| | | | |
|---|---|---|---|
| 3,546,891 A | * 12/1970 | Fekete | ........................ 62/5 |
| 3,775,988 A | * 12/1973 | Fekete | ........................ 62/640 |
| 5,327,728 A | 7/1994 | Tunkel | |
| 5,483,801 A | 1/1996 | Craze | |
| 5,561,982 A | 10/1996 | Tunkel et al. | |
| 5,582,012 A | 12/1996 | Tunkel et al. | |
| 5,819,541 A | 10/1998 | Tunkel et al. | |
| 5,911,740 A | 6/1999 | Tunkel et al. | |
| 5,937,654 A | 8/1999 | Tunkel et al. | |
| 5,950,436 A | 9/1999 | Tunkel et al. | |
| 5,976,227 A | 11/1999 | Lorey | |
| 6,082,116 A | 7/2000 | Tunkel et al. | |

* cited by examiner

Primary Examiner—Robert A. Hopkins
(74) Attorney, Agent, or Firm—Mark E. Fejer

(57) ABSTRACT

A method and system for processing of natural gas in which a gaseous natural gas stream which is made up of a mixture of hydrocarbons is introduced into a vortex tube, forming a hot fluid stream and a cold fluid stream. The cold fluid stream is introduced into the upper section of a distillation column and the hot fluid stream is introduced into the lower section of the distillation column, resulting in improved separation of the heavier hydrocarbon components in the natural gas stream from the lighter hydrocarbon components disposed in the natural gas stream.

13 Claims, 3 Drawing Sheets

VORTEX TUBE SYSTEM AND METHOD FOR PROCESSING NATURAL GAS

BACKGROUND OF THE INVENTION

1. Field of the Invention

This invention relates to a method and apparatus for processing natural gas to separate the heavier hydrocarbon components from the lighter hydrocarbon components typically found in produced natural gas. More particularly, this invention relates to the use of vortex tubes for processing natural gas streams.

2. Description of Related Art

Natural gas, as produced, typically comprises methane, ethane, propane, butane and natural gasoline. Excessive amounts of the heavier hydrocarbon components, e.g. propane, butane and natural gasoline, make the gas unsuitable for use as a gaseous fuel and create problems for gas transportation systems. In addition, the heavier components are usually more valuable when separated from the lighter components. Ethane value is sometimes higher in the gas stream and sometimes higher in the liquid stream.

It is, thus, frequently necessary to process the produced natural gas to separate the heavier hydrocarbon components from the lighter hydrocarbon components. Depending upon the component concentrations and current component values, processing natural gas can be very lucrative. Typically, component separation is carried out by the combination of refrigeration to condense the heavier components and distillation to remove the lighter components from the liquid stream. Refrigeration is often achieved by pressure reduction through a turbo-expander or a Joule-Thompson (J-T) effect control valve. The J-T effect control valve provides cooling of the gaseous stream by adiabatic expansion across a restriction.

A turbo-expander system is the most efficient and effective process for utilizing pressure drop to process produced natural gas. However, it is also expensive to construct, expensive to operate and somewhat inflexible with respect to product separation. The simpler J-T control valve system costs less to construct, costs less to operate and is more flexible with respect to product separation.

A vortex tube, also sometimes referred to as the Ranque Vortex Tube, the Hilsch Tube, the Ranque-Hilsch Tube and "Maxwell's Demon", is a static mechanical device that takes pressurized compressible fluid and derives a hot fluid and a cold fluid at a lower pressure. First discovered by George Ranque in 1928 and later developed by Rudolf Hilsch in 1945, the mechanics of why the Ranque-Hilsch effect separates a fluid into hot and cold parts through depressurizing are largely unknown, but empirical data validate that it is a measurable, repeatable and sustainable event. In operation, the pressurized compressible fluid is injected through tangential nozzles into a vortex chamber in which the compressible fluid is simultaneously separated into a fluid stream higher in temperature than the inlet stream and a fluid stream that is cooler than the inlet stream. One widely accepted explanation of the phenomenon is that tangential injection sets the pressurized compressible fluid stream in a vortex motion. This spinning stream of compressible fluid turns 90° and passes down the hot tube in the form of a spinning shell or vortex, similar to a tornado. A valve at one end of the tube allows some of the warmed fluid to escape. That portion of the warmed fluid that does not escape is directed back down the tube as a second vortex inside the low-pressure area of the larger vortex. This inner vortex loses heat to the larger vortex and exhausts through the other end as a cold fluid stream.

It is known to those skilled in the art that the vortex tube effect can be utilized to separate a multi-component hydrocarbon stream into hot and cold streams. It has also been shown that the hot stream exists in a somewhat richer state, that is, more heavy components than the cold stream, which results in a more efficient component separation than the conventional gas/liquid separator. U.S. Pat. No. 5,976,227 teaches a device for separation of liquid from a gas-liquid mixture comprising a vortex tube through which the gas-liquid mixture flows at speeds generating centrifugal forces with acceleration greater than 50 g, which cause liquid droplets to precipitate on the interior walls of the vortex tube. Concentric channels disposed in the tube wall of the warm end of the tube provide the means for the liquid removal. An outer casing encloses the warm end tube and serves to collect the liquids, which, in turn, are directed to a standalone separator. After removal of the liquids in the warm end tube, the warm and cold gas fractions of the vortex tube are recombined into the "conditioned" gas stream. Use of the vortex in a variety of applications are exemplified by U.S. Pat. No. 5,937,654, which teaches the use of a vortex tube for mixing water with chilled air to produce snow; U.S. Pat. No. 6,082,116, which teaches a vortex heater for transferring a vortex flow's heat flux to a separate gas flow in a system including a vortex tube for the purpose of preventing pilot gas freeze up at gas pressure regulation stations; and U.S. Pat. No. 5,483,801, which teaches a process for extracting vapor from a gas stream using a vortex tube expansion. See also U.S. Pat. No. 5,950,436 and U.S. Pat. No. 5,819,541 (method of beverage cooling/heating on vehicles), U.S. Pat. No. 5,911,740 (method of heat transfer enhancement in vortex tubes), U.S. Pat. No. 5,582,012 (method of natural gas pressure reduction on city gate stations), U.S. Pat. No. 5,561,982 (method for energy separation and utilization in a vortex tube operating at pressures not exceeding atmospheric pressure), and U.S. Pat. No. 5,327,728 (method of designing a vortex tube for energy separation).

Given the state of the art with respect to natural gas processing, it is desirable to improve the efficiency of natural gas processing, reduce the costs associated with natural gas processing, and provide more flexibility in product separation than conventional natural gas processing systems.

SUMMARY OF THE INVENTION

Accordingly, it is one object of this invention to provide a method and apparatus for natural gas processing.

It is one object of this invention to provide a method and apparatus for natural gas processing having improved efficiency over conventional natural gas processing systems.

It is a further object of this invention to provide a method and apparatus for natural gas processing which provides greater flexibility with respect to product separation than conventional natural gas processing systems.

It is another object of this invention to provide a method and apparatus for natural gas processing that is simpler in design and operation than conventional natural gas processing systems.

These and other objects of this invention are addressed by a system for natural gas processing comprising at least one vortex tube having a gaseous natural gas stream inlet, a hot fluid stream outlet and a cold fluid stream outlet, and at least one distillation column having a hot fluid stream inlet in fluid communication with the hot fluid stream outlet and having a cold fluid stream inlet in fluid communication with the cold fluid stream outlet. This use of the vortex tube effect in combination with a distillation column provides a substantial improvement in the efficiency of the natural gas processing system with respect to the separation of hydrocarbon components. In addition, there are no pressure or temperature restrictions. The only requirement is that the natural gas stream be in the gaseous state when it is introduced into the vortex tube.

The surprising result of utilizing a vortex tube for pressure reduction in combination with the typical equipment employed in a J-T control valve processing facility is that component separation is significantly enhanced by feeding the cold stream into the top of the distillation column and feeding the hot stream into the lower section of the distillation column. By virtue of this arrangement, the heat required in the bottom of the distillation column is reduced, resulting in a lower average temperature than with a J-T control valve system.

In accordance with the method of this invention for processing natural gas, a gaseous natural gas stream comprising a mixture of hydrocarbons is introduced into a vortex tube, resulting in the formation of a hot fluid stream and a cold fluid stream. The cold fluid stream is introduced into the upper section of a distillation column and the hot fluid stream is introduced into the lower section of the distillation column, thereby separating heavier hydrocarbon components disposed within the natural gas stream from lighter hydrocarbon components disposed in the natural gas stream.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

Figure 1:
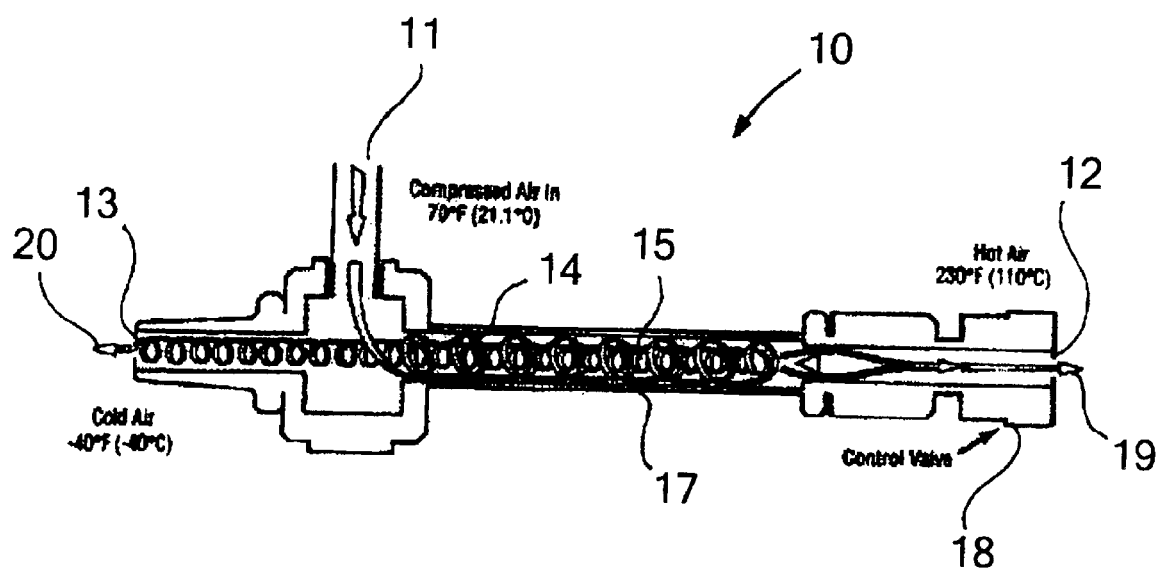
FIG. 1 is a schematic lateral view showing the basic principles of operation of a vortex tube.

One embodiment of a vortex tube suitable for use in the method and system of this invention is shown in FIG. 1. As shown therein, vortex tube 10 comprises a tubular member 17 having a compressed fluid inlet 11, hot fluid outlet 12 disposed at one end of tubular member 17 and a cold fluid outlet 13 disposed at the opposite end of tubular member 17. Connected to the tubular member 17 proximate the hot fluid outlet 12 is a control valve 18, which is used to control the amount of hot fluid 19 expelled from hot fluid outlet 12 of tubular member 17, which, in turn, controls the amount of cold fluid 20 expelled from cold fluid outlet 13 of tubular member 17.

From FIG. 1, the principles of operation of a vortex tube can be seen. As shown therein, a compressed fluid, such as compressed air, is introduced through compressed fluid inlet 11 in a tangential manner whereby an outer vortex 14 is generated within tubular member 17 traveling in the direction of hot fluid outlet 12. A portion of this stream of swirling compressed fluid, the amount of which is controlled by control valve 18, is expelled as a hot fluid stream 19 from hot fluid outlet 12 of tubular member 17. The remaining portion of the compressed fluid within tubular member 17 reverses direction towards cold fluid outlet 13, forming a smaller vortex 15 within the outer vortex 14. This stream is then expelled as a cold fluid stream 20 from cold fluid outlet 13 of tubular member 17.

In accordance with the method and system of this invention, the compressed fluid is a hydrocarbon stream, such as natural gas, comprising a mixture of lighter and heavier hydrocarbons, the hot fluid stream comprises a portion of the heavier hydrocarbons separated out from the mixture and the cold fluid stream comprises lighter hydrocarbons. As used herein, the term "heavy hydrocarbons" refers to those hydrocarbons having more than a single carbon atom (e.g. ethane, propane, butane) and the term "light hydrocarbons" refers to those hydrocarbons having only a single carbon atom (e.g. methane).

Figure 2:
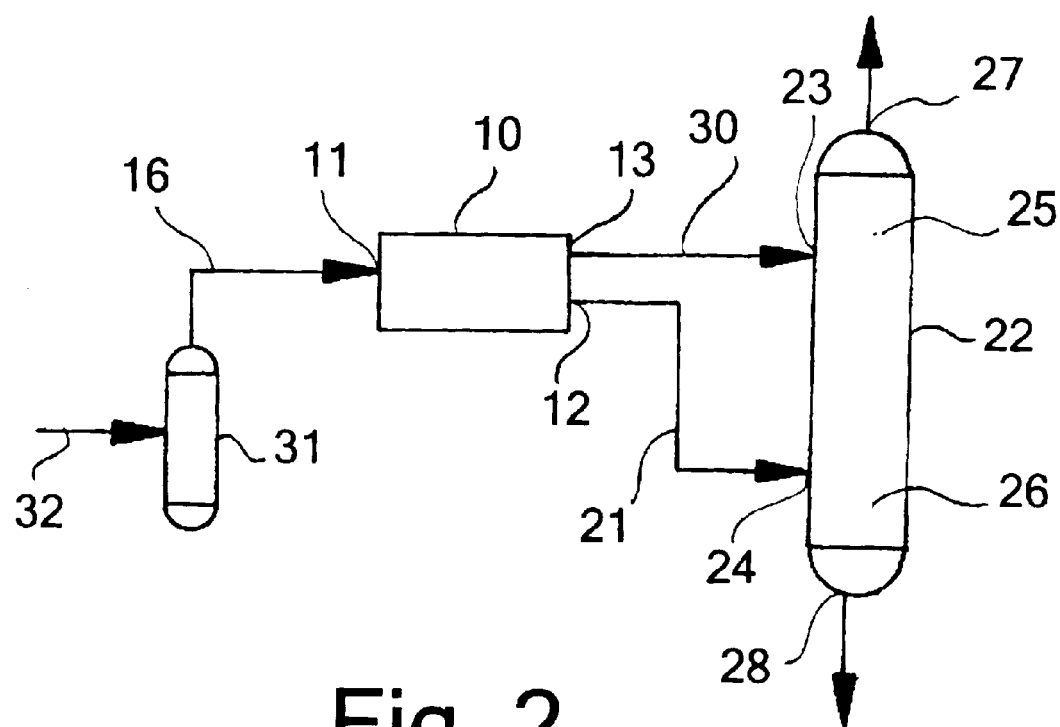
FIG. 2 is a schematic diagram of the basic components of a system for processing natural gas in accordance with one embodiment of this invention.

FIG. 2 shows the basic elements of the system for processing natural gas in accordance with one embodiment of this invention, which basic elements comprise a gas/liquid separator 31 which is used to remove any liquid fluids that may be present in the initial fluid stream 32 for processing, thereby providing a gaseous stream 16 for input through compressed fluid inlet 11 into vortex tube 10. It is a requirement of the method of this invention that the fluid stream introduced into vortex tube 10 is a gaseous stream. In accordance with a particularly preferred embodiment of this invention, a plurality of vortex tubes 10 are employed. Disposed downstream of the vortex tubes 10 and in fluid communication with the hot fluid outlet 12 and cold fluid outlet 13 of vortex tubes 10 is at least one distillation column 22 having a cold fluid inlet 23 in fluid communication with cold fluid outlet 13 disposed such that cold fluid stream 30 is introduced into an upper section 25 of distillation column 22 and having a hot fluid inlet 24 in fluid communication with hot fluid outlet 12 disposed such that hot fluid stream 21 is introduced into a lower section 26 of distillation column 22. Distillation column 22 includes a gaseous fluid outlet 27 disposed proximate the top of distillation column 22 through which the lighter hydrocarbons are expelled and a liquid fluid outlet 28 disposed proximate the bottom of distillation column 22 through which the heavier liquid hydrocarbons are expelled.

Figure 3:
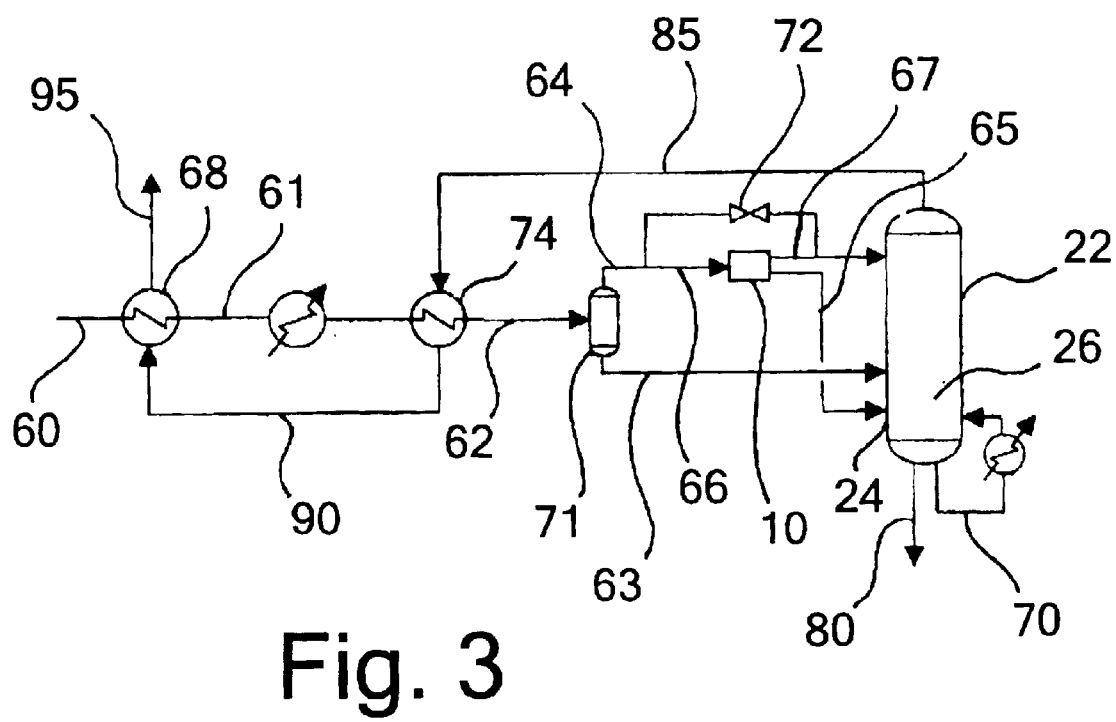
FIG. 3 is a schematic diagram of a system for processing natural gas utilizing one or more vortex tubes in accordance with one embodiment of this invention.

FIG. 3 is a diagram showing a low temperature separation or liquefied petroleum gas process and system for processing of natural gas in accordance with one embodiment of this invention. As shown therein, heat is exchanged between an inlet stream 60 and stream 90 in heat exchanger 68 to a 5 or 10° F. approach temperature. The cooled inlet gas 61 may be chilled in a propane chiller (not shown) or it may flow directly to a gas/liquid separator 71. If the gas is chilled, it will flow to heat exchanger 74 in which heat is exchanged with stream 85 to achieve a 10° F. approach. Stream 62 is a two-phase stream, that is liquid and gas. The liquid stream 63 is fed directly to the distillation column 22 or it may be combined with the hot stream 65 to be fed to the distillation column. Stream 64 will flow to stream 66, which flows into a bank of vortex tubes 10. In accordance with one embodiment of this invention, control of the vortex tube flow is accomplished by a manifold of N vortex tubes, each designed for 1/N of the design flow. Each vortex tube is designed for a fixed volume at the selected operating pressure. During start-up, flow is initiated through a bypass control valve 72. When the flowing volume reaches the design volume of a vortex tube, a block valve opens to the inlet of the first vortex tube. As the volume continues to increase, the control valve opens until the total volume reaches the design volume of two vortex tubes. A block valve opens to a second vortex tube and the control valve closes. This sequence is repeated for each vortex tube until full flow is achieved. For shutdown, the sequence is reversed. In accordance with one embodiment of this invention, control is achieved by a pressure control valve in fluid communication with each outlet of each vortex tube, which pressure control valves open and close the vortex tubes in sequence. The cold stream 67 from the vortex tube(s) combines with the flow, if any, from control valve 72. The combined stream is then introduced into the top section of the distillation column 22. The hot stream 65 from the vortex tube(s) is introduced into the distillation column 22 at hot fluid inlet 24 in the lower section 26 of the distillation column or it may be combined with stream 63 before being introduced into the distillation column. Stream 70 flows from the bottom of the distillation column through a heater and back into the column. Stream 80 delivers the liquid product to specification. The cold gas leaves the distillation column by means of stream 85, exchanges heat with the incoming stream 60 and flows out as processed natural gas stream 95.

It will be apparent to those skilled in the art that, although described herein in connection with the processing of natural gas, the method and system of this invention may be applied to a broad spectrum of gaseous streams comprising a mixture of lighter and heavier components for separation, and such applications are deemed to be within the scope of this invention.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

We claim:

1. A method for processing of natural gas comprising the steps of:
    introducing a gaseous natural gas stream comprising a mixture of hydrocarbons into a plurality of vortex tubes, flow of said gaseous natural gas stream through each of said vortex tubes being controlled by a plurality of pressure control valves, each of said pressure control valves connected to a vortex tube outlet of a corresponding said vortex tube, forming a hot fluid stream and a cold fluid stream;
    introducing said cold fluid stream into an upper section of a distillation column; and
    introducing said hot fluid stream into a lower section of said distillation column, separating heavier hydrocarbon components from lighter hydrocarbon components disposed in said natural gas stream.

2. A method in accordance with claim 1, wherein said mixture of hydrocarbons comprises hydrocarbons selected from the group consisting of methane, ethane, propane, butane and natural gasoline.

3. A method in accordance with claim 1, wherein said gaseous natural gas stream is introduced into each of said vortex tubes in sequence.

4. A method in accordance with claim 3, wherein said plurality of pressure control valves are opened and closed in sequence, thereby enabling sequential flow and sequential flow interruption through said plurality of vortex tubes.

5. A system for natural gas processing comprising:
    at least one vortex tube having a gaseous natural gas stream inlet, a hot fluid stream outlet and a cold fluid stream outlet;
    a flow control valve in fluid communication with each of said vortex tubes; and
    at least one distillation column having a hot fluid stream inlet in fluid communication with said hot fluid stream outlet and having a cold fluid stream inlet in fluid communication with said cold fluid stream outlet.

6. A system in accordance with claim 5, wherein each said vortex tube is designed for a volume of gaseous natural gas stream flowthrough that is dependent upon a set pressure drop across said vortex tube.

7. A system in accordance with claim 5, wherein said flow control valve is a block valve having a valve outlet in fluid communication with said gaseous natural gas stream inlet.

8. A system in accordance with claim 5, wherein said flow control valve is a pressure control valve having a fluid inlet in fluid communication with one of said hot fluid stream outlet and said cold fluid stream outlet.

9. A system in accordance with claim 5, wherein said cold fluid stream inlet is disposed in an upper section of said distillation column and said hot fluid stream inlet is disposed in a lower section of said distillation column.

10. A method for processing a gaseous stream comprising the steps of:
    introducing a gaseous stream comprising a mixture of components to be separated into a plurality of vortex tubes, flow of said gaseous stream through each of said vortex tubes being controlled by a plurality of pressure control valves, each of said pressure control valves connected to a vortex tube outlet of a corresponding said vortex tube forming a hot fluid stream and a cold fluid stream;
    introducing said cold fluid stream into an upper section of a distillation column; and
    introducing said hot fluid stream into a lower section of said distillation column, separating a first portion of said components from a second portion of said components disposed in said gaseous stream.

11. A method in accordance with claim 10, wherein said gaseous stream comprises gas comprising heavier hydrocarbon components and lighter hydrocarbon components.

12. A method in accordance with claim 10, wherein said gaseous stream is introduced into each of said vortex tubes in sequence.

13. A method in accordance with claim 10, wherein said plurality of pressure control valves are opened and closed in sequence, thereby enabling sequential flow and sequential flow interruption through said plurality of vortex tubes.

* * * * *